(12) United States Patent
Svoboda et al.

(10) Patent No.: US 6,442,790 B1
(45) Date of Patent: Sep. 3, 2002

(54) PORTABLE BLOWER/VACUUM HAVING AIR INLET COVER ATTACHABLE TO BLOWER TUBE

(75) Inventors: Steven J. Svoboda, Bloomington; Chadwick A. Shaffer, Oakdale, both of MN (US)

(73) Assignee: The Toro Company, Bloomington, MN (US)

(*) Notice: Subject to any disclaimer, the term of this patent is extended or adjusted under 35 U.S.C. 154(b) by 0 days.

(21) Appl. No.: 09/779,966

(22) Filed: Feb. 9, 2001

(51) Int. Cl.[7] .................................................. A47L 5/14
(52) U.S. Cl. ............................ 15/330; 15/319; 15/422
(58) Field of Search ........................ 15/319, 330, 405, 15/412, 422

(56) References Cited

U.S. PATENT DOCUMENTS

| | | | |
|---|---|---|---|
| 2,024,367 A | 12/1935 | Eriksson-Jons | 15/330 |
| 4,288,886 A | 9/1981 | Siegler | 15/330 |
| 4,290,165 A | 9/1981 | Hiramatsu et al. | 15/330 |
| 4,325,163 A | 4/1982 | Mattson et al. | 15/330 |
| 4,413,371 A | 11/1983 | Tuggle et al. | 15/405 |
| 4,451,951 A | 6/1984 | Satoh | 15/330 |
| D279,319 S | 6/1985 | McCloskey et al. | |
| 4,550,277 A | 10/1985 | Carney | 388/809 |
| 4,694,528 A | 9/1987 | Comer et al. | 15/330 |
| D299,570 S | 1/1989 | Kiyooka et al. | |
| D299,571 S | 1/1989 | Kiyooka et al. | |
| D304,510 S | 11/1989 | Baker et al. | |
| 4,912,805 A | 4/1990 | Krasznai et al. | 15/392 |
| 4,928,347 A | 5/1990 | Krasznai et al. | 15/344 |
| 4,951,348 A | 8/1990 | Krasznai et al. | 15/414 |
| D310,437 S | 9/1990 | Gierke et al. | |
| 4,955,107 A | 9/1990 | Kawai | 15/339 |
| 4,968,174 A | 11/1990 | Krasznai et al. | 403/327 |
| D313,831 S | 1/1991 | Gildersleeve | |
| 5,003,662 A * | 4/1991 | Everts | 15/330 |
| 5,035,586 A * | 7/1991 | Sadler et al. | 15/344 |
| 5,084,934 A | 2/1992 | Lessig, III et al. | 15/325 |
| 5,115,538 A | 5/1992 | Cochran et al. | 15/383 |
| 5,222,275 A | 6/1993 | Baker et al. | 15/329 |
| 5,245,726 A | 9/1993 | Rote et al. | 15/339 |
| 5,256,032 A | 10/1993 | Dorsch | 415/121.1 |
| 5,331,716 A | 7/1994 | Hemmann et al. | 15/332 |
| 5,388,302 A | 2/1995 | Sundaram et al. | 15/344 |
| D358,912 S | 5/1995 | Baker et al. | |
| D368,341 S | 3/1996 | Pink | |
| 5,511,281 A | 4/1996 | Webster | 15/330 |
| 5,522,115 A | 6/1996 | Webster | 15/330 |
| 5,535,479 A | 7/1996 | Pink et al. | 15/410 |
| 5,560,078 A | 10/1996 | Toensing et al. | 15/339 |
| D375,822 S | 11/1996 | Lessig, III et al. | |

(List continued on next page.)

FOREIGN PATENT DOCUMENTS

GB    324972    2/1930

OTHER PUBLICATIONS

Sears, Roebuck and Co., "Operator's Manual CRAFTSMAN® 1.4 cu. in./24cc 2–Cycle Gasoline Powered Blower/Vac/Mulcher Model No. 358.797931," Hoffman Estates, Illinois; Aug. 12, 1996 (14 sheets).

*Primary Examiner*—Robert J. Warden, Sr.
*Assistant Examiner*—Theresa T. Snider
(74) *Attorney, Agent, or Firm*—Mueting, Raasch & Gebhardt, P.A.

(57) ABSTRACT

A blower/vacuum having an air inlet cover and a blower tube, both of which attach to a blower housing for operation in a blower mode. The air inlet cover is preferably able to removably attach to the blower housing and the blower tube. Blower/vacuums of the present invention may generally prohibit operation unless both the blower tube and the air inlet cover are first installed. The blower/vacuum is further adapted to operate in a vacuum mode by removing the air inlet cover and blower tube and replacing the same with a vacuum tube assembly and a vacuum collection container, respectively.

23 Claims, 8 Drawing Sheets

U.S. PATENT DOCUMENTS

| | | | |
|---|---|---|---|
| 5,588,178 A | 12/1996 | Liu | 15/330 |
| 5,604,954 A | 2/1997 | Webster et al. | 15/330 |
| 5,638,574 A * | 6/1997 | Haupt et al. | 15/330 |
| 5,659,920 A | 8/1997 | Webster et al. | 15/344 |
| 5,673,457 A | 10/1997 | Webster et al. | 15/330 |
| D386,841 S | 11/1997 | DeMore et al. | |
| 5,689,852 A | 11/1997 | Svoboda et al. | 15/405 |
| 5,692,262 A | 12/1997 | Haupt et al. | 15/339 |
| 5,701,632 A | 12/1997 | Webster et al. | 15/330 |
| 5,711,048 A | 1/1998 | Pink et al. | 15/347 |
| 5,727,283 A | 3/1998 | Webster | 15/409 |
| 5,768,743 A | 6/1998 | Webster | 15/330 |
| 5,791,568 A | 8/1998 | Keim | 241/47 |
| 5,794,864 A | 8/1998 | Hammett et al. | 241/56 |
| D400,322 S | 10/1998 | Webster et al. | |
| D405,566 S | 2/1999 | Webster et al. | |
| D416,360 S | 11/1999 | Enkyo et al. | |
| 5,979,013 A | 11/1999 | Beckey et al. | 15/326 |
| 6,003,199 A | 12/1999 | Shaffer | 15/405 |
| 6,014,812 A | 1/2000 | Webster | 30/276 |
| RE36,627 E | 3/2000 | Pink et al. | 15/347 |
| 6,059,541 A | 5/2000 | Beckey et al. | 417/295 |
| D426,354 S | 6/2000 | Ohi et al. | |
| 6,158,082 A | 12/2000 | Beckey et al. | 15/326 |

* cited by examiner

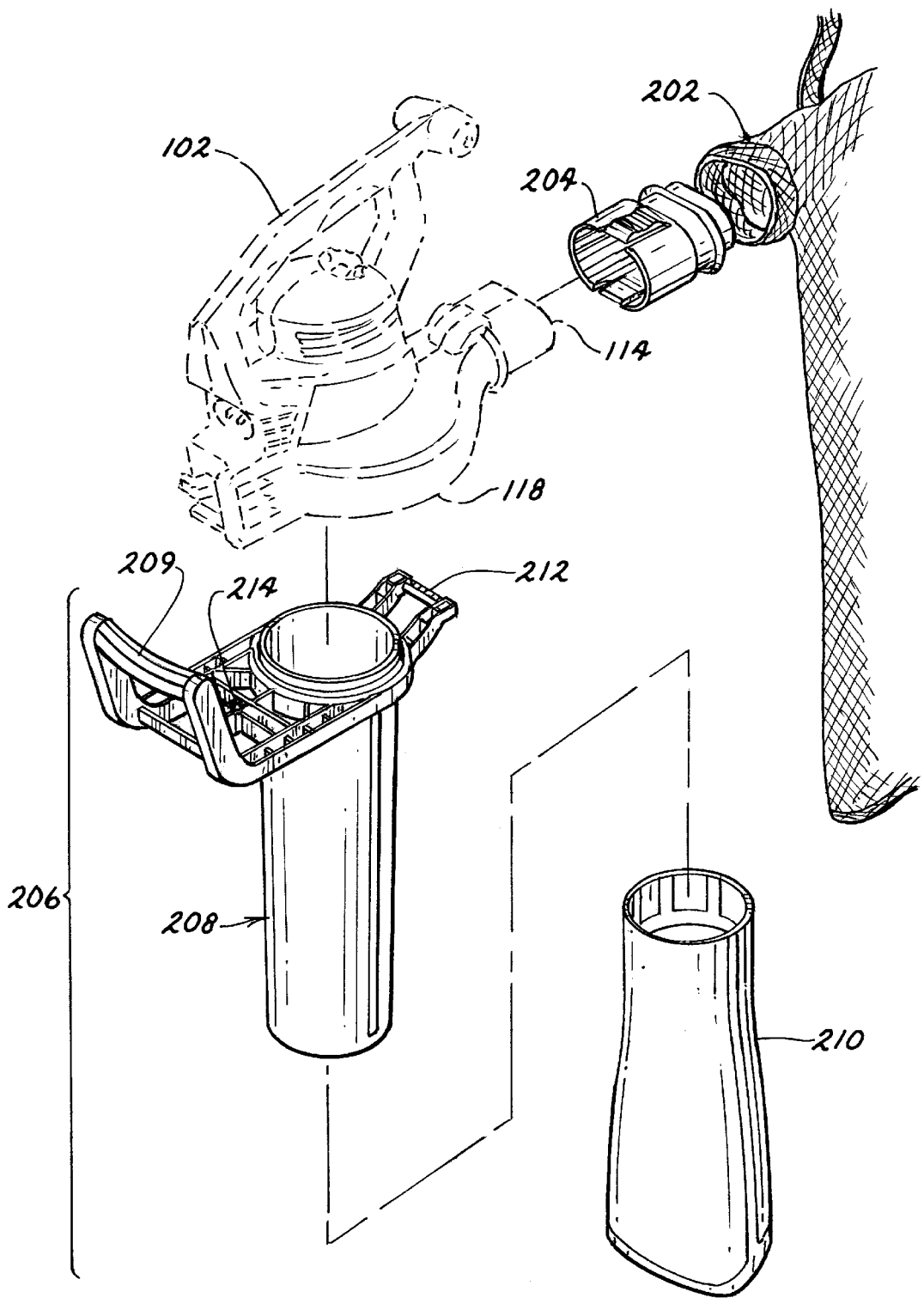

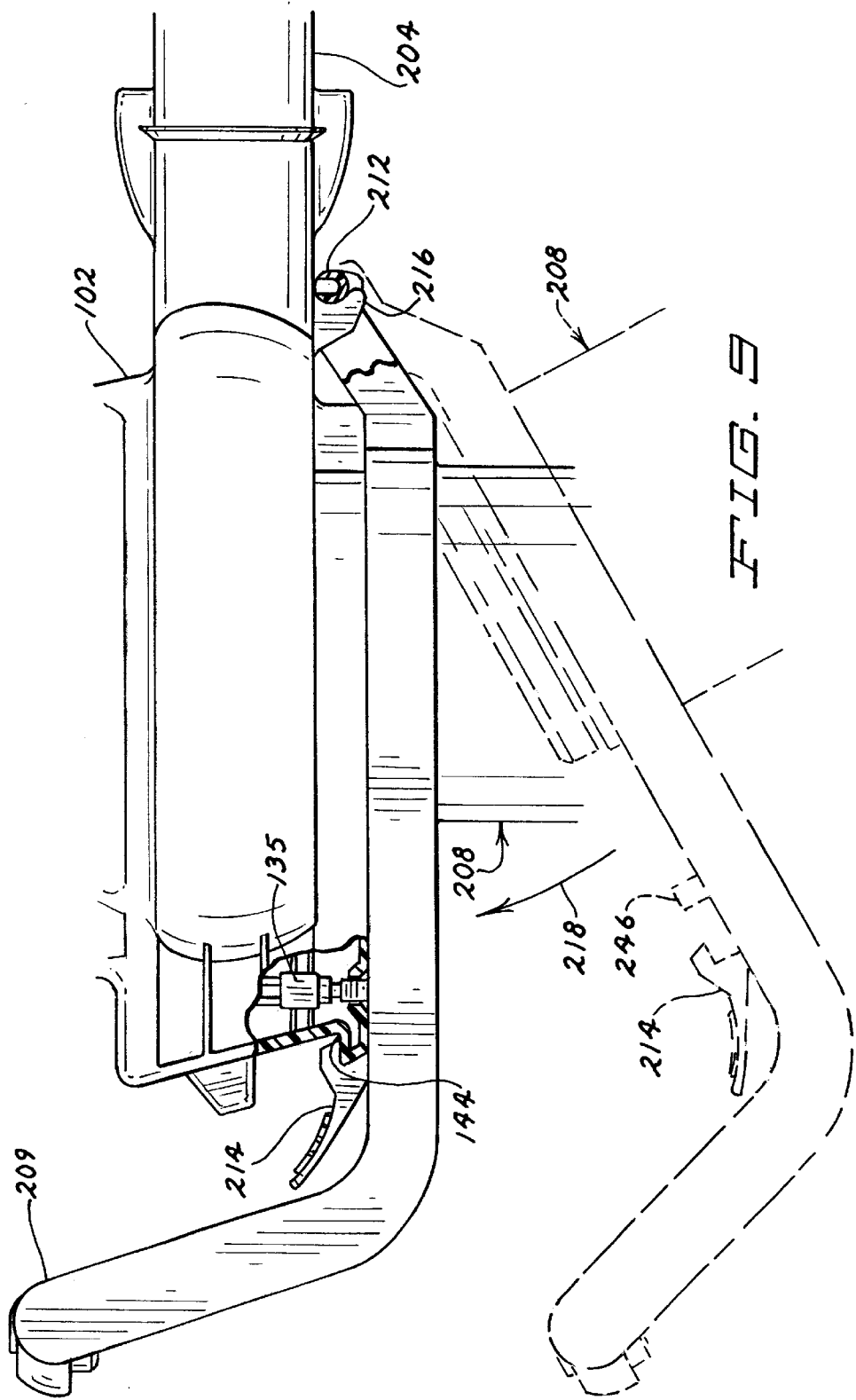

PORTABLE BLOWER/VACUUM HAVING AIR INLET COVER ATTACHABLE TO BLOWER TUBE

TECHNICAL FIELD

The present invention relates to the field of hand-held, portable blower/vacuums. More particularly, the present invention pertains to portable blower/vacuums having an air inlet cover that may be removably coupled to both a blower housing and a blower tube.

BACKGROUND

Convertible blower/vacuum units (blower/vacs) are commonly used by homeowners and professionals alike for the removal of debris from yards, driveways, sidewalks, etc. As used herein, a convertible blower/vac is a portable device which can be configured for use as either a debris blower or a debris vacuum. When used as a vacuum, vacuum attachments coupled to the blower housing permit leaves or similar debris to be vacuumed into an attached bag or other debris container.

When used in the blower configuration, blower/vacs provide a sweeping action created by the production of a fast moving stream of air generated by a rotating impeller located within the blower housing. The impeller draws air into the housing through an air inlet opening and exhausts an accelerated air stream through a housing outlet. The air stream is typically channeled through a tapered, removable blower tube. In addition to providing a more precisely focused air stream, the tapered blower tube also yields an air stream of generally higher velocity.

Because most all blower/vac units are designed for hand-held use, they are often made of lightweight materials and utilize lightweight power sources, e.g., small electric- (battery and corded) and gasoline-powered motors. While applicable to blower/vacs having most any power source, the present invention is particularly advantageous for use with corded electric blower/vacs and the remainder of this discussion will focus on the same.

Although size and weight are criteria to consider in selection of the blower/vac motor, available power is also a factor. Generally speaking, maximum electric current draw for these and other portable consumer devices may be restricted, e.g., by applicable industry and/or governmental standards, to ensure conformance with conventional household circuits and available electrical equipment (e.g., extension cords). For example, a typical blower/vac may be designed to operate, within acceptable margins, with a 120 volt, 15 amp circuit.

Nonetheless, a blower/vac motor designed to draw a particular current load under normal operating conditions, e.g., when operating in blower mode with the blower tube installed, may, under certain circumstances, exceed that limit. For example, removal of the blower tube may increase the air flow rate through the blower. This increased air flow rate results in a higher torque load, which, in turn, causes the motor to spin more slowly and draw more current. This increased current may exceed the desired limit.

One solution to this "tube removed" condition is to provide a motor designed to draw the maximum desired current load when operating with the blower tube removed. However, such a motor may draw less current, and provide a less than optimal air flow rate, when the blower tube is then installed.

Another option is to configure the blower/vac motor for optimal air flow rate, e.g., draw the maximum desired current load, when operating with the blower tube installed. However, as mentioned above, this option may result in a motor that draws increased current when the blower tube is then removed.

While either option is acceptable, a solution that yields the desired current draw, i.e., produces the maximum air flow rate, with the blower tube installed while at the same time preventing excessive current draw when the blower tube is removed would be advantageous.

SUMMARY OF THE INVENTION

A blower/vac is provided that, generally speaking, prevents motor operation unless at least the blower tube and air inlet cover are installed. Accordingly, the motor may be selected for optimal blower/vac operation without concern for excessive current draw should the blower tube be removed.

In one embodiment, a portable blower/vac is provided which includes a housing having an air inlet opening and a housing outlet. A blower tube operable to removably couple to the housing outlet is further provided, as is an air inlet cover. The air inlet cover is operable to removably cover the air inlet opening. The air inlet cover is securable relative to the air inlet opening by engaging at least a portion of the housing and a portion of the blower tube.

In another embodiment of the present invention, a method for assembling a portable blower/vac is provided. In this embodiment, a blower housing is provided having an air inlet opening and a housing outlet. The method further includes coupling a blower tube to the housing outlet of the blower housing, and attaching an air inlet cover over the air inlet opening. The air inlet cover is releasably engaged with both the blower tube and the blower housing.

In yet another embodiment of the present invention, a method for assembling and using a portable blower/vac is provided. The method includes providing a blower housing where the housing has an air inlet opening and a housing outlet. A blower tube is coupled to the housing outlet of the blower housing. The method also includes providing an air inlet cover; engaging a first attachment member of the air inlet cover with a first attachment receiver on the blower tube; and engaging a second attachment member of the air inlet cover with a second attachment receiver on the blower housing.

In still yet another embodiment, a portable blower/vac is provided which includes a blower housing. The blower housing itself includes a housing outlet; an air inlet opening in fluid communication with the housing outlet; and a rotatable impeller coupled to a motor. The impeller is operable to draw air into the housing through the air inlet opening and expel the air through the housing outlet. The blower/vac further includes a blower tube attachable to the housing outlet and an air inlet cover adapted to removably cover the air inlet opening. The air inlet cover is securable by engaging both a portion of the blower tube and a portion of the blower housing.

The above summary of the invention is not intended to describe each embodiment or every implementation of the present invention. Rather, a more complete understanding of the invention will become apparent and appreciated by reference to the following detailed description and claims in view of the accompanying drawings.

BRIEF DESCRIPTION OF THE DRAWINGS

The present invention will be further described with reference to the drawings, wherein:

FIG. 8 is an exploded, perspective view of the blower/vac of FIG. 1 as configured for operation in vacuum mode in accordance with one embodiment of the invention; and FIG. 9 is a side elevation view of the blower/vac of FIG. 8 illustrating the attachment of the vacuum tube assembly.

DETAILED DESCRIPTION OF EXEMPLARY EMBODIMENTS

Figure 1:
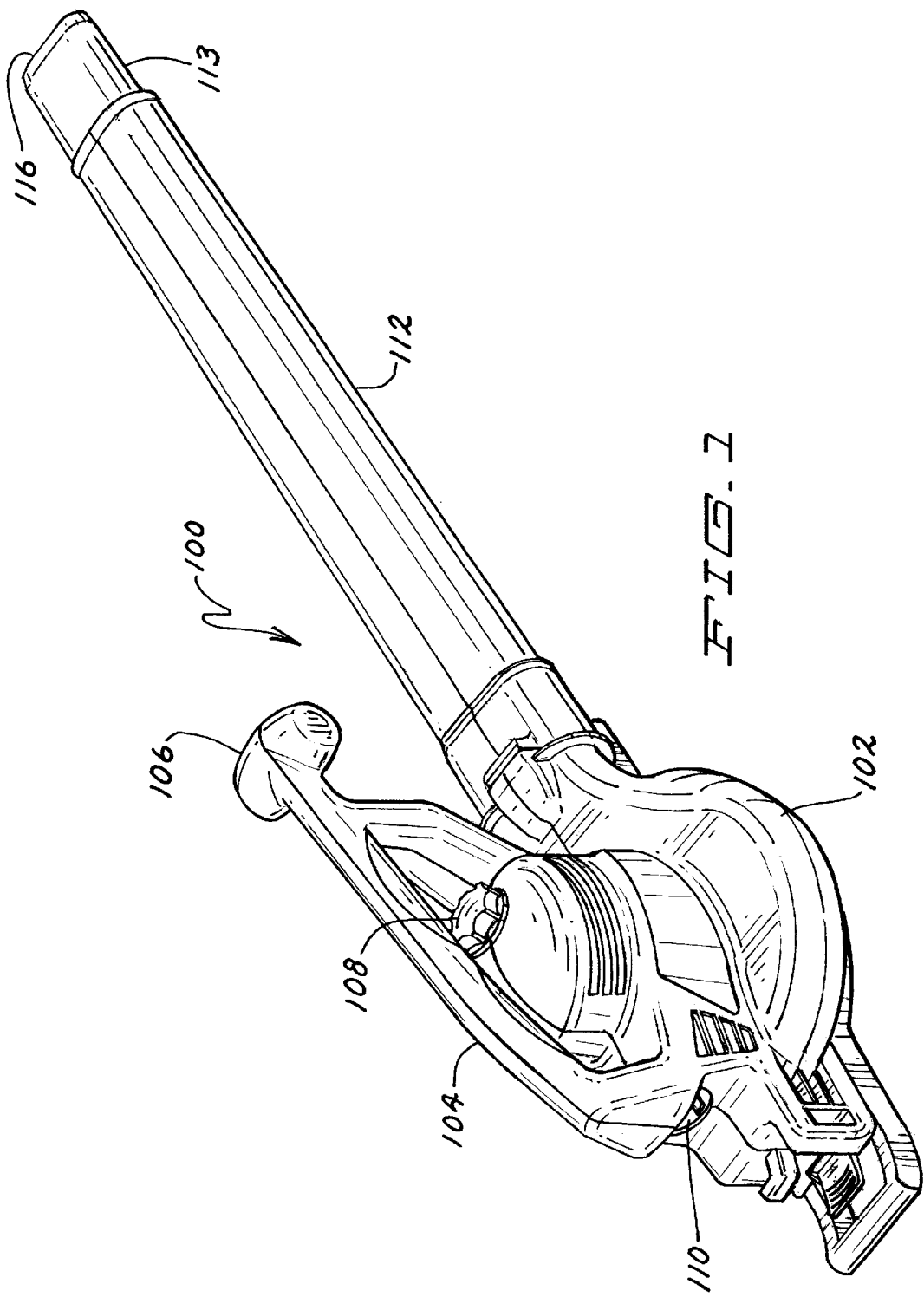
FIG. 1 is a perspective view of a blower/vac in accordance with one embodiment of the invention, the blower/vac shown as configured in blower mode with the blower tube and air inlet cover installed.

In the following detailed description of the exemplary embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present With reference to the drawings, wherein like reference numerals designate like parts and assemblies throughout the several views, FIG. 1 shows a perspective view of a portable, electric blower/vacuum 100 (also referred to herein as "blower" or "lower/vac") in accordance with one embodiment of the invention. While the present invention is perceived to be particularly advantageous for use with corded electric blower/vacs, those skilled in the art will appreciate that it may also be used with most any type of blower/vac, e.g., gas-engine powered units or battery-powered units. Furthermore, while described herein with application to blower/vacs, the present invention is equally applicable to units configurable as blower-only machines.

Unless otherwise noted, relative directions (e.g., upper, top, lower, bottom, etc.) are exemplary only and may, for purposes of explanation, generally refer to the orientation of the particular part or assembly when the blower/vac 100 is in its operating position, e.g., the position generally illustrated in FIG. 1.

As the name suggests, embodiments of the blower/vac 100 described and illustrated herein may be configured to operate in either a blower mode or a vacuum mode. Regardless of the operating mode, these blower/vacs typically include a blower housing 102 having one or more handles 104 and 106 adapted to receive one or both hands of an operator during use. The housing 102 furthermore may include a receptacle for receiving external AC power, e.g., a receptacle 110 for receiving an electrical cord. To selectively control delivery of external power from the receptacle 110 to a motor (described in more detail below) located within the housing, a switch 108 may also be provided. In one embodiment, the switch 108 is coupled in series between the receptacle 110 and the motor. The switch 108 may merely open or close the power delivery circuit or, alternatively, may vary the power to the motor to provide adjustable motor speed.

Figure 2:
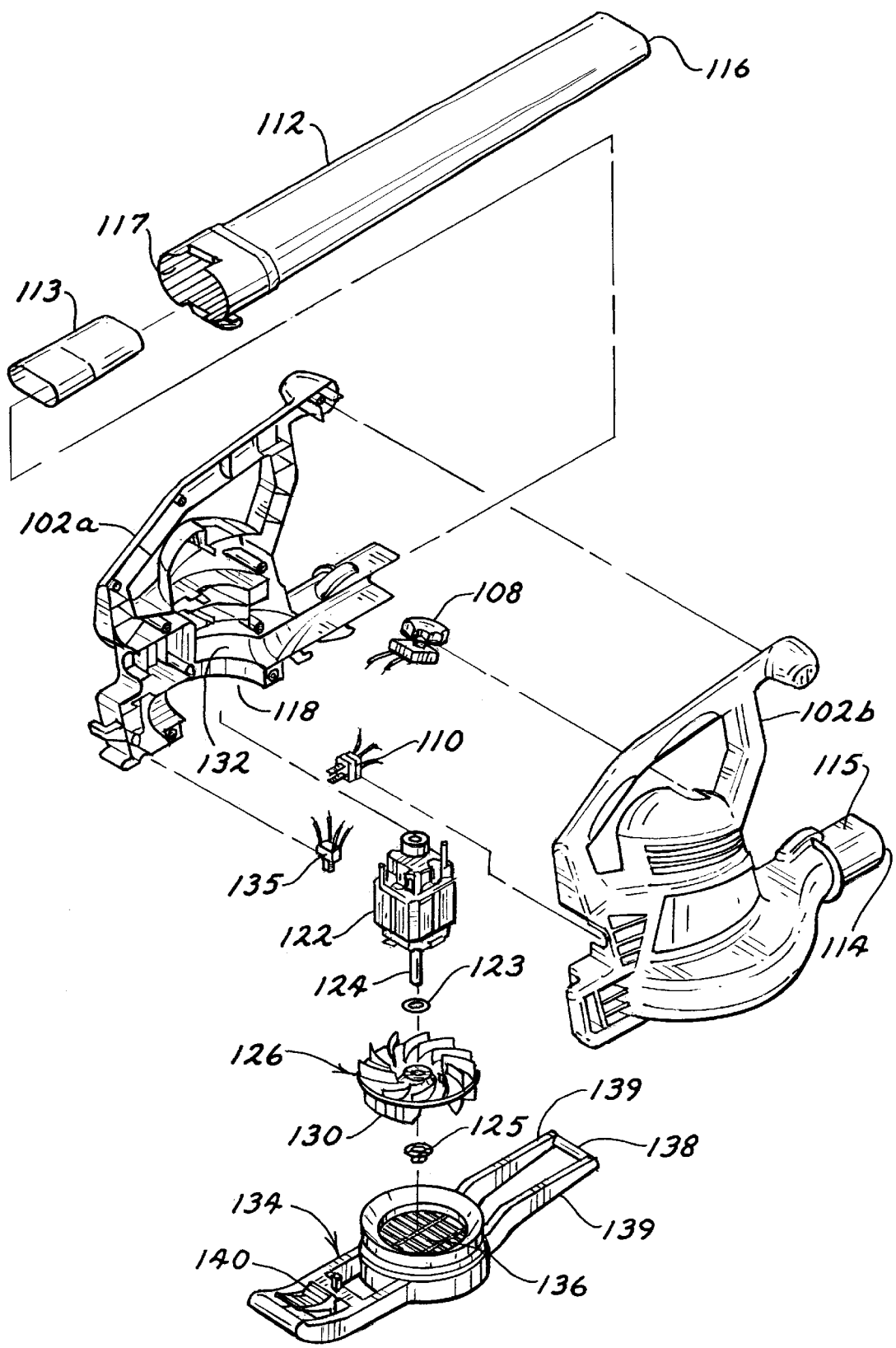
FIG. 2 is an exploded, perspective view of the blower/vac of FIG. 1.

When operating in blower mode, the blower/vac 100 preferably includes a blower tube 112 as shown in FIG. 1. The blower tube 112 has a proximate end which preferably attaches to a single housing outlet 114 (see FIGS. 2 and 3). In one embodiment, the proximate end of the blower tube forms a female portion 117 which slides over a male portion 115 formed by the housing outlet 114 (see Figure The blower tube 112 typically tapers from the proximate end to a blower outlet 116 at a distal end. The tapered blower tube 112 is advantageous as it permits focusing of the high velocity air stream produced by the blower/vac 100. To further reduce the cross-sectional size of the blower outlet 116, a nozzle insert 113—as generally shown in FIGS. 1 and 2 and particularly described in commonly-assigned U.S. Pat. No. 6,003,199—may optionally be provided.

FIG. 2 shows the blower/vac 100 of FIG. 1 in an exploded perspective view. As depicted herein, the housing 102 may preferably be formed from mating plastic halves 102a and 102b which, when assembled, define an interior cavity. The cavity encloses a power source, e.g., an electric motor 122. The electric motor 122 is coupled to an impeller 126 via an output shaft 124 with connecting hardware, e.g., washer 123 and nut 125. When external power is provided to the motor 122, the output shaft 124, and thus the impeller 126, rotate. As the impeller 126 rotates, curved blades 130 (see FIG. 3) integrally formed with or otherwise attached to the impeller draw air into a plenum 132 formed within the housing 102. In general, air is drawn into the housing 102 through an air inlet opening 118 (see FIG. 3) where it is then accelerated and exhausted through the housing outlet 114 and blower tube 112. In some embodiments, the air inlet opening 118 resides within a first plane on a lower side of the housing 102 while the housing outlet 114 lies in a second plane that may be substantially perpendicular to the first plane.

Figure 3:
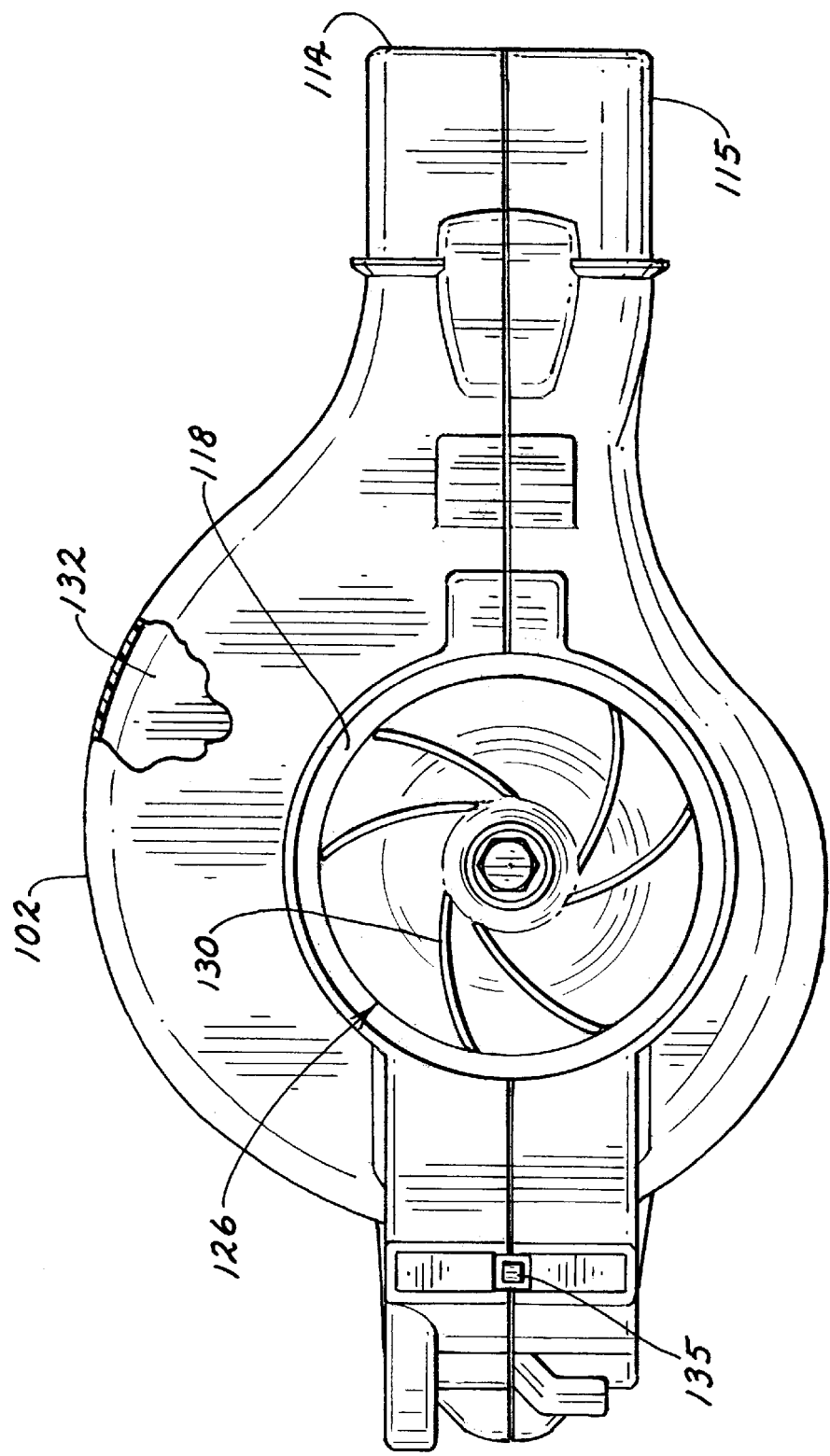
FIG. 3 is a bottom plan view of the blower/vac of FIG. 1 shown with the blower tube and air inlet cover removed.

FIG. 2 further illustrates an air inlet cover 134 in accordance with one embodiment of the present invention. A purpose of the air inlet cover 134 is to permit air to pass through the air inlet opening 118 (see FIG. 3) and into the housing 102 while, at the same time, restricting the entry of foreign objects, e.g., debris, fingers. Accordingly, the air inlet cover 134 may include a grate or grill portion 136 which covers the air inlet opening 118 when the air inlet cover 134 is installed (see FIG. 4). An interlock sensor, e.g., switch 135, explained in more detail below, may also be associated with the housing 102 as shown in FIGS. 2 and 3. The interlock switch 135, which may, for example, be wired in series with the motor 122, prevents operation of the motor unless the air inlet cover 134 is properly installed.

Figure 4:
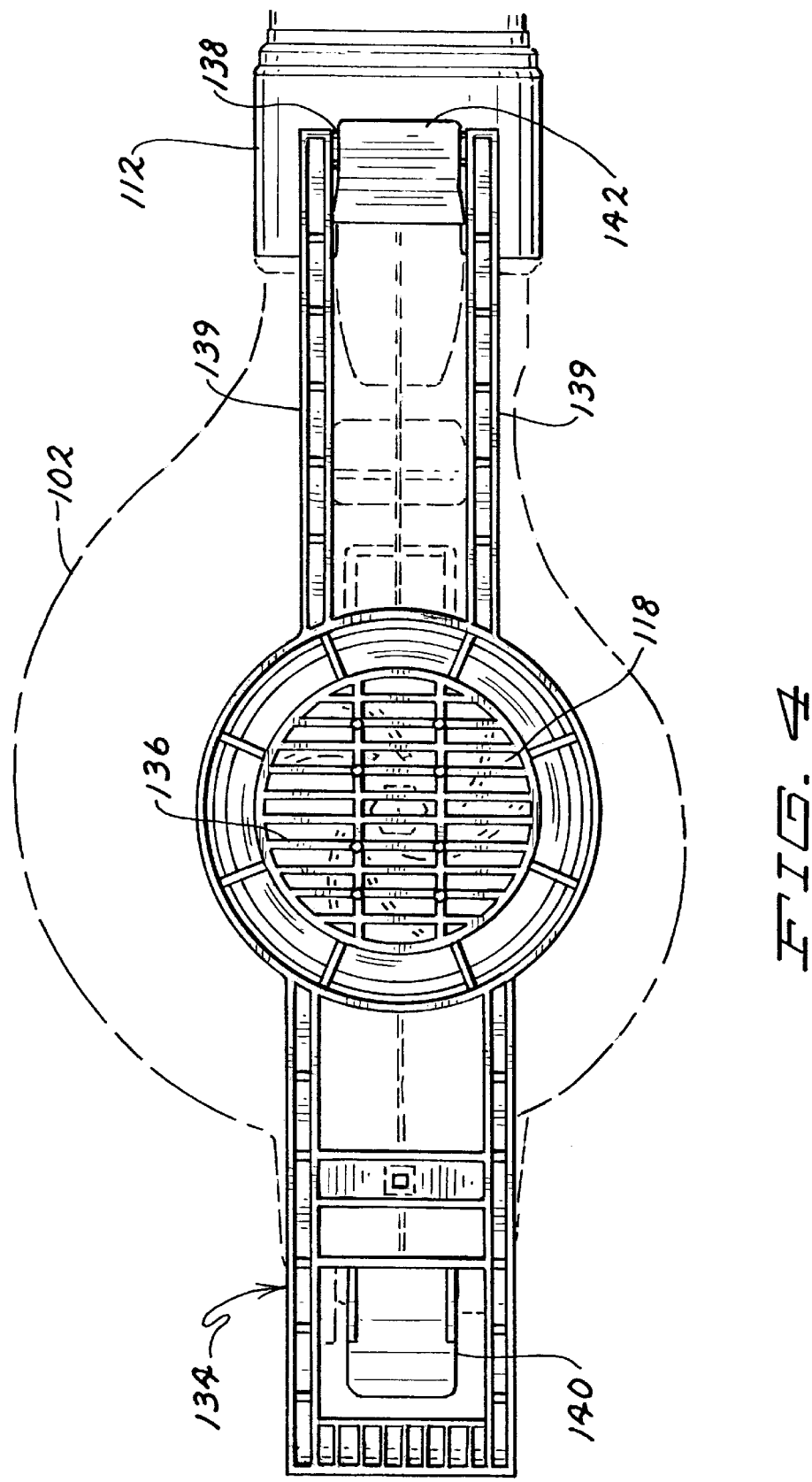
FIG. 4 is a bottom plan view of the blower/vac of FIG. 1 shown with the blower tube and air inlet cover installed.

Having described the blower/vac 100 generally, attention is now directed to a exemplary air inlet cover 134 as illustrated primarily in FIGS. 4–7. As previously stated, the air inlet cover 134 removably attaches to the housing 102 such that the air grate portion 136 covers the air inlet opening 118 as shown in FIG. 4. in addition to the air grate portion 136, the air inlet cover 134 further includes a first attachment member 138 and a second attachment member 140 which are shown in more detail in FIG. 5. In one embodiment, the first attachment member 138 is connected to the air grate portion 136 by a pair of generally parallel rails 139 (see FIG. 4). The first attachment member 138 is preferably received by a first attachment receiver 142 formed on or otherwise attached to the blower tube 112. The second attachment member 140 is likewise preferably received by a second attachment receiver 144 formed on or otherwise attached to the housing 102 (see FIG. 5).

The geometry of the air inlet cover 134 and the first and second attachment members 138 and 140 is such that engagement of both the first and second attachment members 138 and 140 with the first and second attachment receivers 142 and 144, respectively, securely engages the air inlet cover 134 relative to both the blower tube 112 and the housing 102. "Secure" engagement is used herein to refer to engagement of components in such a way that unintended disengagement or decoupling during normal operation is generally prevented. Preferably, the second 110 attachment member 140 and the second attachment receiver 144 are unable to releasably secure the air inlet cover 134 unless the first attachment member 138 is first engaged with the first attachment receiver 142 as described below.

The terms attachment "member" and attachment "receiver" are used herein merely to simplify the description of the illustrated embodiments. Broadly speaking, the terms may include most any interconnecting structures. For instance, other embodiments of the present invention may reverse the location of the attachment members and attachment receivers, e.g., the first attachment member 138 may be located on the blower tube 112 while the first attachment receiver 142 may be located on the air inlet cover 134.

Figure 5:
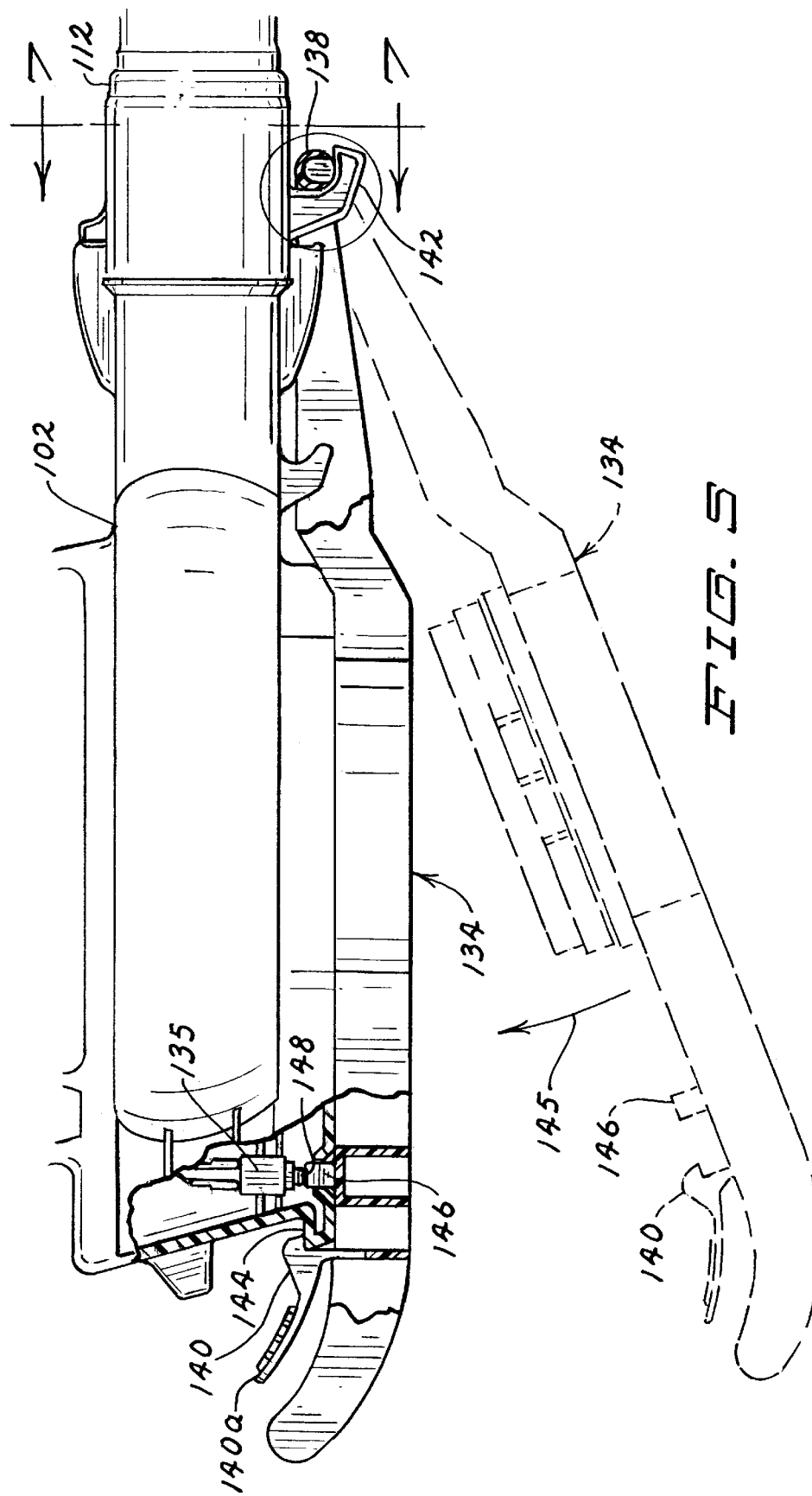
FIG. 5 is a side elevation view of the blower/vac of FIG. 1 illustrating attachment of the air inlet cover in accordance with one embodiment of the invention.
Figure 6:
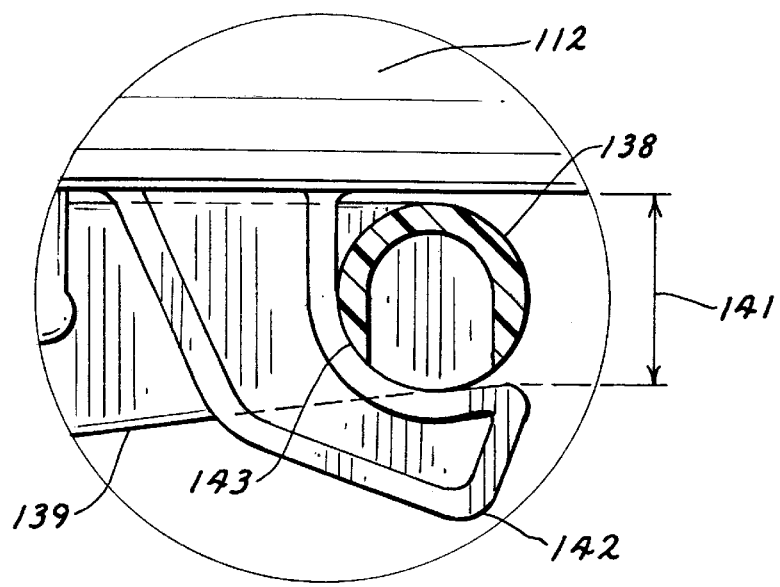
FIG. 6 is an enlarged view of a portion of the blower/vac of FIG. 5.

FIG. 6 is a partial, enlarged view of the first attachment member 138 and the first attachment receiver 142 of FIG. 5. As clearly illustrated, the first attachment member 138 may form an element having a shape that is generally cylindrical or at least partially cylindrical, e.g., a pin, spanning between the rails 139 (see FIG. 2). The first attachment receiver 142, on the other hand, may form a receiving or mating element e.g., a J-shaped hook or open-sided hinge, adapted to receive the cylindrically-shaped first attachment member 138. In one embodiment, the first attachment receiver 142 has a clearance opening 141 sufficient to permit the first attachment member 138 to pass therethrough. Once the first attachment member 138 is in place, it may bear against a corresponding interior surface 143 of the first attachment receiver 142 as shown in FIG. 6. The air inlet cover 134 may be disengaged from the blower tube 112, provided that the second attachment member 140 has not yet been engaged with the second attachment receiver 144, by sliding the cover 134 in the forward direction until the first attachment member 138 disengages from, e.g., slides out of, the first attachment receiver 142.

Once the first attachment member 138 is engaged with the first attachment receiver 142, the air inlet cover 134 may pivot about the first attachment receiver 142 indicated in FIG. 5. The second attachment member 140 may then be rotated towards the second attachment receiver 144 (as indicated by arrow 145 in FIG. 5) and latched thereto. The second attachment member 140 preferably forms a flexible tab integrally formed with or otherwise attached to a rearward portion of the air inlet cover 134. The second attachment member 140 may engage the second attachment receiver 144 (which, in one embodiment, forms a substantially rigid lip) with a snap fit. The term "snap fit," as used herein, describes the joining of one resilient flexible member with another flexible or rigid member. The flexible member may deflect initially upon contact with the other member but ultimately returns or "snaps back" to its undeflected, or to a partially deflected, position, thereby securing one member with respect to the other. Once the second attachment member 140 and second attachment receiver 144 are completely engaged, the air in cover 134, and thus the blower tube 112, are securely engaged with the housing As the air inlet cover 134 is pivoted in the direction 145 from an unlatched position (shown in broken lines in FIG. 5) to a latched position (shown in solid lines), an interlock engagement member, e.g., protrusion 146, located on the air inlet cover engages an actuator button 148 located on the interlock switch 135. When the air inlet cover 134 is completely installed, e.g., the second attachment member 140 latches with the second attachment receiver 144, the button 148 is sufficiently depressed to engage and close the interlock switch 135, permitting operation of the electric motor 122. When the second attachment member 140 is disengaged, i.e., unlatched, from the second attachment receiver 144, the button 148, which is preferably biased outwardly, returns the interlock switch 135 to its normally open position, preventing operation of the electric motor 122. In some embodiments, the second attachment member 140 may include a flexible tab 140a (see FIG. 5) to assist the operator in disengaging the second attachment member 140 from the second attachment receiver 144 after use. If desired, the air inlet cover 134 may then be disengaged from the first attachment receiver 142 as described above. Thus, the air inlet cover 134 may be separated from both the housing 102 and the blower tube 112.

Figure 7:
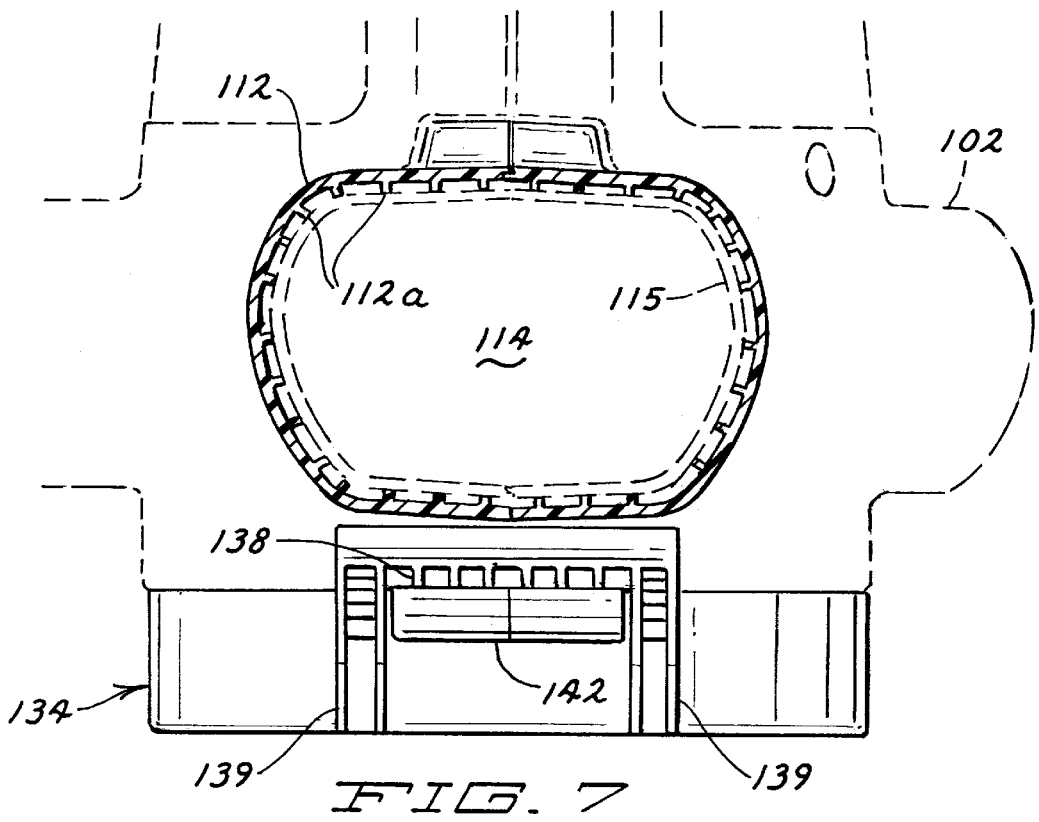
FIG. 7 is a section view taken along lines 7—7 of FIG. 5.

To operate the blower/vac 100 in blower mode, the blower tube 112 may first be coupled to the outlet 114 of the housing 102. In one embodiment, the female portion 117 (see FIG. 2) of the proximate end of the blower tube 112 slides over the male portion 115 (see FIG. 3) of the housing outlet 114. A cross-sectional view taken along lines 7—7 of FIG. 5 is shown in FIG. 7. As illustrated herein, the blower tube 112 may include small structural ribs 112a that provide increased rigidity to the blower tube and may further assist with its attachment. Preferably, the shape of the blower tube 112 and outlet 114 prevents coupling of the blower tube 112 in any but the desired orientation, e.g., with the first attachment receiver 142 extending downwardly. Once the blower tube 112 is in place, the first attachment member 138 may then be engaged with the first attachment receiver 142. Thereafter, the air inlet cover 134 may be rotated in the direction 145 (see FIG. 5) about the first attachment member 138 until the second attachment member 140 engages the second attachment receiver 144 with a snap fit. As the second attachment member 140 and second attachment receiver 144 are engaged, the protrusion 146 closes the interlock switch 135, permitting operation of the motor 122.

Engagement of the second attachment member 140 with the second attachment receiver 144 alone is preferably incapable of retaining the air inlet cover 134 to the blower housing 102. As a result, the air inlet cover 134 cannot be coupled to the housing 102, nor can the interlock switch 135 be correctly engaged, without first engaging the first attachment member 138 with the first attachment receiver 142. Stated another way, the blower/vac 100 generally cannot operate in blower mode unless both the blower tube 112 and the air inlet cover 134 are installed as described herein. As a result, blower/vacs 100 of the present invention may utilize motors sized for maximum performance with the blower tube 112 installed without concern for potential current overdraw when the blower tube is removed. Other advantages may also be realized. For example, attachment of the separate air inlet cover 134 and blower tube 112 may be detected with the use of a single interlock sensor, e.g., switch 135.

Although not depicted, one or more additional mechanisms for securing the blower tube 112 to the housing 102 may also be provided, such that the blower tube 112 may be secured independent of the air inlet cover 134.

Still other embodiments are possible without departing from the scope of the invention. For example, as mentioned above, the first attachment member, e.g., a pin member, may be located on the blower tube 112 while the first attachment receiver, e.g., a hook element, may be located on the air inlet cover 134. Moreover, the first and second attachment members and attachment receivers may be configured to couple in alternative manners. For example, instead of pivoting about a transverse axis (e.g., the axis of the first attachment member 138 as shown in FIG. 5) as described and illustrated, the first attachment member 138 and first attachment receiver 142 may be configured to permit pivoting of the air inlet cover 134 about most any axis, e.g., about an axis generally parallel to the axis of the impeller 126. The second attachment member 140 and second attachment receiver 144 may be reconfigured to accommodate such alternative configurations without departing from the scope of the invention. In still other embodiments, the air inlet cover 134 may be attached via translational displacement instead of by pivotal movement as described herein. For instance, after engaging the first attachment member 138 with first attachment receiver 142, the air inlet cover 134 may be displaced, e.g., pulled, rearwardly, preferably against a forwardly-biasing force, to engage a modified second attachment member 140 with the second attachment receiver 144.

FIGS. 8 and 9 illustrate a blower/vac of the present invention as configured for use as a vacuum. In particular, FIG. 8 illustrates a vacuum tube assembly 206 adapted to couple to the housing 102 at the air inlet opening 118. The vacuum tube assembly 206 may include an upper tube 208 and a lower tube 210. The lower tube 210 may flare to provide more effective vacuum operation. The upper tube 208 preferably includes a first vacuum attachment member 212, similar in most respects to the first attachment member 138 (see FIGS. 5 and 6), and a second vacuum attachment member 214, similar in most respects to the second attachment member 140 (see FIG. 5). To collect vacuumed debris, a vacuum collection container, e.g., bag 202, is coupled to the housing outlet 114 via a vacuum bag collar 204. In some embodiments, the bag 202 and collar 204 are permanently or semi-permanently coupled, i.e., they are not intended to be separated by the operator. During operation, the impeller 126 draws air and entrained debris through the vacuum tube assembly 206. In the vacuum configuration, the impeller 126 may, in addition to generating vacuum air flow, mulch or shred the debris before expelling it out of the housing outlet 114 and into the vacuum collection bag 202.

FIG. 9 is a side view of the housing 102 and upper tube 208 of FIG. 8. As stated above, the upper tube 208 preferably includes coupling features, e.g., first and second vacuum attachment members 212 and 214, for attaching the tube assembly 206 to the housing 102. The first vacuum attachment member 212 may engage a first vacuum attachment receiver 216. The first vacuum attachment receiver 216 may be similar in most respects to the first attachment receiver 142 (see FIG. 5) except that it may be integrally formed with or otherwise attached to the housing 102 instead of the blower tube 112. If desired, the first vacuum attachment receiver 216 could also be connected to or engaged with the bag collar 204. Once the first vacuum attachment member 212 is engaged with the first vacuum attachment receiver 216, the upper tube 208 may pivot in the direction 218 until the second vacuum attachment member 214 engages the second attachment receiver 144 of the housing 102. The engagement of the second vacuum attachment member 214 with the second attachment receiver 144 may be via a snap fit. A protrusion 246 may engage the interlock switch 135 in a manner similar to that discussed with respect to protrusion 146. Accordingly, the upper tube 208 attaches to the housing 102 in a manner similar to that of the air inlet cover 134 described above. When installed, the upper tube 208 may provide a secondary handle 209 which allows more comfortable operation for vacuum operations.

Exemplary embodiments of the present invention are described above. Those skilled in the art will recognize that many embodiments are possible within the scope of the invention. For instance, the configuration of the attachment members an attachment receivers could be most any design that permits coupling of the air inlet cover, housing, and blower tube as described herein. Other variations, modifications, and combinations of the various parts and assemblies can certainly be made and still fall within the scope of the invention. Thus, the invention is limited only by the following claims, and equivalents thereto.

What is claimed is:

1. A portable blower/vacuum comprising:

a housing having an air inlet opening and a housing outlet;

a blower tube operable to removably couple to the housing outlet; and an air inlet cover operable to removably cover the air inlet opening, wherein the air inlet cover is securable relative to the air inlet opening by engaging at least a portion of the housing and a portion of the blower tube.

2. The blower/vacuum of claim 1, wherein the air inlet cover further comprises a first attachment member and a second attachment member, the first attachment member adapted to engage a first attachment receiver located on the blower tube and the second attachment member adapted to engage a second attachment receiver located on the housing.

3. The blower/vacuum of claim 2, wherein the engagement of the first attachment member with the first attachment receiver and the engagement of the second attachment member with the second attachment receiver securely engages both the blower tube and the air inlet cover to the housing.

4. The blower/vacuum of claim 2, further comprising an interlock sensor operable to detect latching engagement of the second attachment member with the second attachment receiver.

5. The blower/vacuum of claim 2, wherein the first attachment member comprises a pin and the first attachment receiver comprises a hook.

6. The blower/vacuum of claim 5, wherein engagement of the pin with the hook permits the air inlet cover to pivot between a first unlatched position and a second latched position, the second latched position corresponding to secure engagement of the air inlet cover to the housing.

7. A method for assembling a portable blower/vacuum, comprising:

providing a blower housing, the housing having an air inlet opening and a housing outlet;

coupling a blower tube to the housing outlet of the blower housing; and attaching an air inlet cover over the air inlet opening, the air inlet cover releasably engaged with both the blower tube and the blower housing.

8. The method of claim 7, wherein coupling the blower tube comprises sliding a female portion of the blower tube over a male portion of the housing outlet.

9. The method of claim 7, wherein attaching the air inlet cover comprises engaging a first attachment member on the air inlet cover with a first attachment receiver on the blower tube and engaging a second attachment member on the air inlet cover with a second attachment receiver on the blower housing.

10. The method of claim 9, further comprising:

disengaging the second attachment member from the second attachment receiver;

disengaging the first attachment member from the first attachment receiver;

removing the air inlet cover from the blower housing; and removing the blower tube from the blower housing.

11. The method of claim 7, further comprising:

providing an interlock engagement member on the air inlet cover; and engaging, with the interlock engagement member, an interlock sensor associated with the blower housing.

12. A method for assembling and using a portable blower/vacuum, comprising:

providing a blower housing, the housing having an air inlet opening and a housing outlet;

coupling a blower tube to the housing outlet of the blower housing; providing an air inlet cover;

engaging a first attachment member of the air inlet cover with a first attachment receiver on the blower tube; and engaging a second attachment member of the air inlet cover with a second attachment receiver on the blower housing.

13. The method of claim 12, further comprising engaging, with the air inlet cover, an interlock sensor coupled to the blower housing.

14. The method of claim 12, further comprising operating the blower/vacuum after engagement of the second attachment member with the second attachment receiver.

15. A portable blower/vacuum comprising:

a blower housing, the housing having:
  a housing outlet;
  an air inlet opening in fluid communication with the housing outlet; and
  a rotatable impeller coupled to a motor, the impeller operable to draw air into the housing through the air inlet opening and expel the air through the housing outlet;

a blower tube attachable to the housing outlet;

air inlet cover adapted to removably cover the air inlet opening, the air inlet cover securable by engaging both a portion of the blower tube and a portion of the blower housing.

16. The blower/vacuum of claim 15, wherein the blower housing further comprises an interlock sensor engageable by an interlock engagement member on the air inlet cover.

17. The blower/vacuum of claim 15, further comprising:

a first attachment receiver located on the blower tube;

a first attachment member and a second attachment member located on the air inlet cover; and a second attachment receiver located on the housing, wherein the first attachment member is adapted to engage the first attachment receiver and the second attachment member is adapted to engage the second attachment receiver.

18. The blower/vacuum of claim 17, wherein the engagement of the first attachment member and the first attachment receiver permits the air inlet cover to pivot between a first unlatched position and a second latched position.

19. The blower/vacuum of claim 18, wherein, in the second latched position, the air inlet cover and the blower tube are securely engaged to the blower housing.

20. A portable blower/vacuum system comprising:

a housing having an air inlet opening and a housing outlet;

a blower tube operable to removably couple to the housing outlet; and an air inlet cover operable to removably cover the air inlet opening, the air inlet cover having a first attachment member operable to engage a first attachment receiver on the blower tube and a second attachment member operable to engage a second attachment receiver on the housing.

21. The blower/vacuum system of claim 20, further comprising:

a vacuum collection container operable to removably couple to the housing outlet; and a vacuum tube assembly operable to removably cover the air inlet opening, the vacuum tube assembly having a first vacuum attachment member operable to engage a first vacuum attachment receiver on the housing and a second vacuum attachment member operable to engage the second attachment receiver on the housing.

22. The blower/vacuum system of claim 21, wherein the housing further comprises an interlock sensor engageable by an interlock engagement member on the vacuum tube assembly.

23. The blower/vacuum system of claim 21, wherein the engagement of the first vacuum attachment member with the first vacuum attachment receiver permits the vacuum tube assembly to pivot between a first unlatched position and a second latch position.

* * * * *

UNITED STATES PATENT AND TRADEMARK OFFICE
CERTIFICATE OF CORRECTION

PATENT NO.    : 6,442,790 B1                                                              Page 1 of 1
DATED         : September 3, 2002
INVENTOR(S)   : Svobada et al.

It is certified that error appears in the above-identified patent and that said Letters Patent is hereby corrected as shown below:

Column 3,
Line 31, after "present" please insert -- invention. --;
Line 36, please delete " "lower/vac" " and insert -- "blower/vac" --;

Column 4,
Line 50, please delete "a exemplary" and insert -- an exemplary --;

Column 9,
Line 18, please move "providing an air inlet cover;" to line 19;
Line 43, please insert -- an -- before "air inlet cover".

Signed and Sealed this

Fifth Day of August, 2003

JAMES E. ROGAN
*Director of the United States Patent and Trademark Office*